United States Patent [19]

Brearley

[11] Patent Number: 5,295,736
[45] Date of Patent: Mar. 22, 1994

[54] TRAILER BRAKING CONTROL SYSTEM FOR A TOWING VEHICLE

[75] Inventor: Malcolm Brearley, Solihull, England

[73] Assignee: Lucas Industries public limited company, Solihull, England

[21] Appl. No.: 936,405

[22] Filed: Aug. 31, 1992

[30] Foreign Application Priority Data

Aug. 31, 1991 [GB] United Kingdom ............... 9118709

[51] Int. Cl.[5] .................................................. B60T 8/00
[52] U.S. Cl. ....................................... 303/7; 188/3 R; 188/112 R; 303/100; 303/15; 303/20; 303/118.1
[58] Field of Search ........................... 303/2-3, 303/20, 93, 100, 15-18, 7-9, 102, 103, 118.1, 107, 111; 188/3 R, 3 H, 158, 112 AK

[56] References Cited

U.S. PATENT DOCUMENTS

| 4,712,839 | 12/1987 | Brearley et al. | 303/3 |
| 4,743,072 | 5/1988 | Brearley | 303/15 |
| 4,795,219 | 1/1989 | Brearley et al. | 303/15 X |
| 5,004,299 | 4/1991 | Brearley et al. | 303/15 |
| 5,004,300 | 4/1991 | Brearley et al. | 303/15 |
| 5,050,938 | 9/1991 | Brearley et al. | 303/20 X |
| 5,080,445 | 1/1992 | Brearley et al. | 303/15 X |

FOREIGN PATENT DOCUMENTS

| 0370671 | 5/1990 | European Pat. Off. |
| 0385648 | 9/1990 | European Pat. Off. |
| 0387004 | 9/1990 | European Pat. Off. |
| WO87/05571 | 9/1987 | PCT Int'l Appl. |
| WO91/09758 | 7/1991 | PCT Int'l Appl. |

Primary Examiner—Douglas C. Butler
Attorney, Agent, or Firm—Oblon, Spivak, McClelland, Maier & Neustadt

[57] ABSTRACT

A trailer braking control system which is adapted to modify trailer braking from a towing vehicle by regulating the coupling head service braking pressure signal generated on the towing vehicle in response to driver's demand pressure and measured values of longitudinal force exerted on the trailer coupling just before and during braking. At least two adaptive variables are developed on the towing vehicle, and on selected qualifying stops of the towing vehicle/trailer combination, one of these adaptive variables is chosen to be corrected at the end of that stop using average trailer thrust error signals for use in regulating trailer braking on subsequent stops.

12 Claims, 4 Drawing Sheets

TRAILER BRAKING CONTROL SYSTEM FOR A TOWING VEHICLE

The present invention relates to trailer braking systems for towing vehicles and, in particular, to a stand alone trailer braking control apparatus adapted to be installed on a towing vehicle fitted with a conventional braking system, i.e. one not having electro-pneumatic braking (EPB) for the towing vehicle brakes.

It is already known from our earlier European Patents Nos 0370671 and 0385648 for a towing vehicle equipped with electro-pneumatic braking (EPB) to support dual adaptive loops which simultaneously regulate towing vehicles and trailer braking in such a way as to produce the required vehicle deceleration and the preferred braking distribution between the towing vehicle and trailer. These patents established the concept of an adaptive system which could provide a learning process whereby the towing vehicle trailer control system could gradually learn the condition of trailer braking and adapt the pressure output to the trailer to regulate the braking to a point where the trailer thrust, as measured by a trailer thrust/tension sensor on the tow bar, was near to zero.

The system disclosed herein has a similar basic objective but is to be capable of being applied to a towing vehicle having a conventional activation system (non EPB) which, basically comprises pneumatic elements only.

In accordance with the present invention there is provided a trailer braking control system which is adapted to modify trailer braking from a towing vehicle by regulating the coupling head service braking pressure signal generated on the towing vehicle in response to driver's demand and measured values of longitudinal force exerted on the trailer coupling just before and during braking, characterised in that at least two adaptive variables (STEP, A1, A2, A3) are developed in the control system on the towing vehicle, and in that, on selected qualifying stops of the towing vehicle/trailer combination, one of said adaptive variables (STEP, A1, A2, A3) is chosen to be corrected at the end of that stop using average trailer thrust error signals, for use in regulating trailer braking on subsequent stops.

In one preferred arrangement, one of said adaptive variables is a threshold pressure step, which is adjusted by thrust error signals so that braking is commenced on the trailer at the same point of input demand that braking is produced on the towing vehicle.

Preferably, for forming said thrust error signals used to correct said one adaptive variable, a background or "natural" retardation thrust on the towing vehicle is accepted just before braking commences and the level of trailer thrust is stored and used as a reference thrust, either fully or in a reducing percentage, as the vehicle speed falls.

Advantageously, at high braking demands the thrust error signals are formed from trailer thrust measurements uncorrected, without using said stored "natural" retardation thrust.

The average thrust exerted by the trailer can be assessed during a given period of the stop, such period commencing after a preset inhibit duration which starts at the commencement of braking. The assessment period may be variable, depending upon the vehicle speed at the commencement of the stop, but always starts after said preset inhibit period.

At very high braking demands above a preset threshold, any adaptive reduction in braking is progressively reduced as the demand exceeds the latter threshold and, at full demand, full braking is signalled at the trailer.

In the event of very high trailer thrust error signals being detected, the adaptive process is preferably commenced in the course of the stop in order to reduce this error, not to zero, but to a minimum threshold, either positive or negative, from which it is further corrected by normal adaptive means on a step-by-step basis.

The invention is described further hereinafter, by way of example only, with reference to the accompanying drawings, in which.

Figure 4:
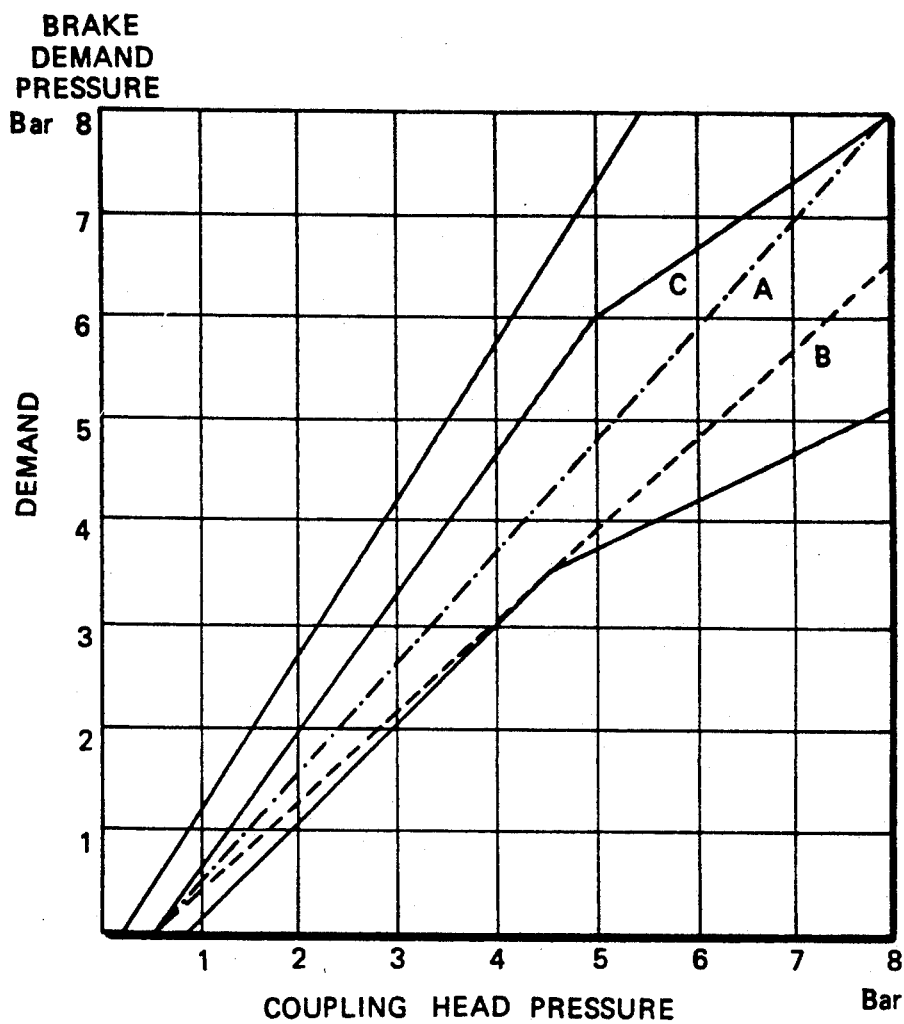
Figure 5:
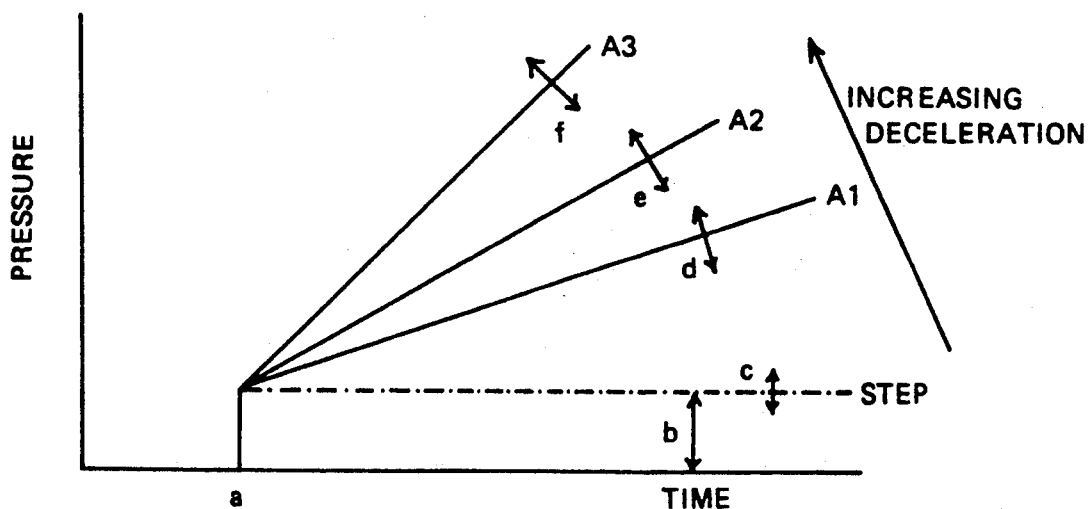

FIG. 4 shown traces of coupling head pressures between the towing vehicle and trailer against brake demand pressure for different trailer braking capabilities; and FIG. 5 is a diagrammatic illustration of a number of possible responses of the system corresponding to different levels of braking/deceleration.

Figure 1:
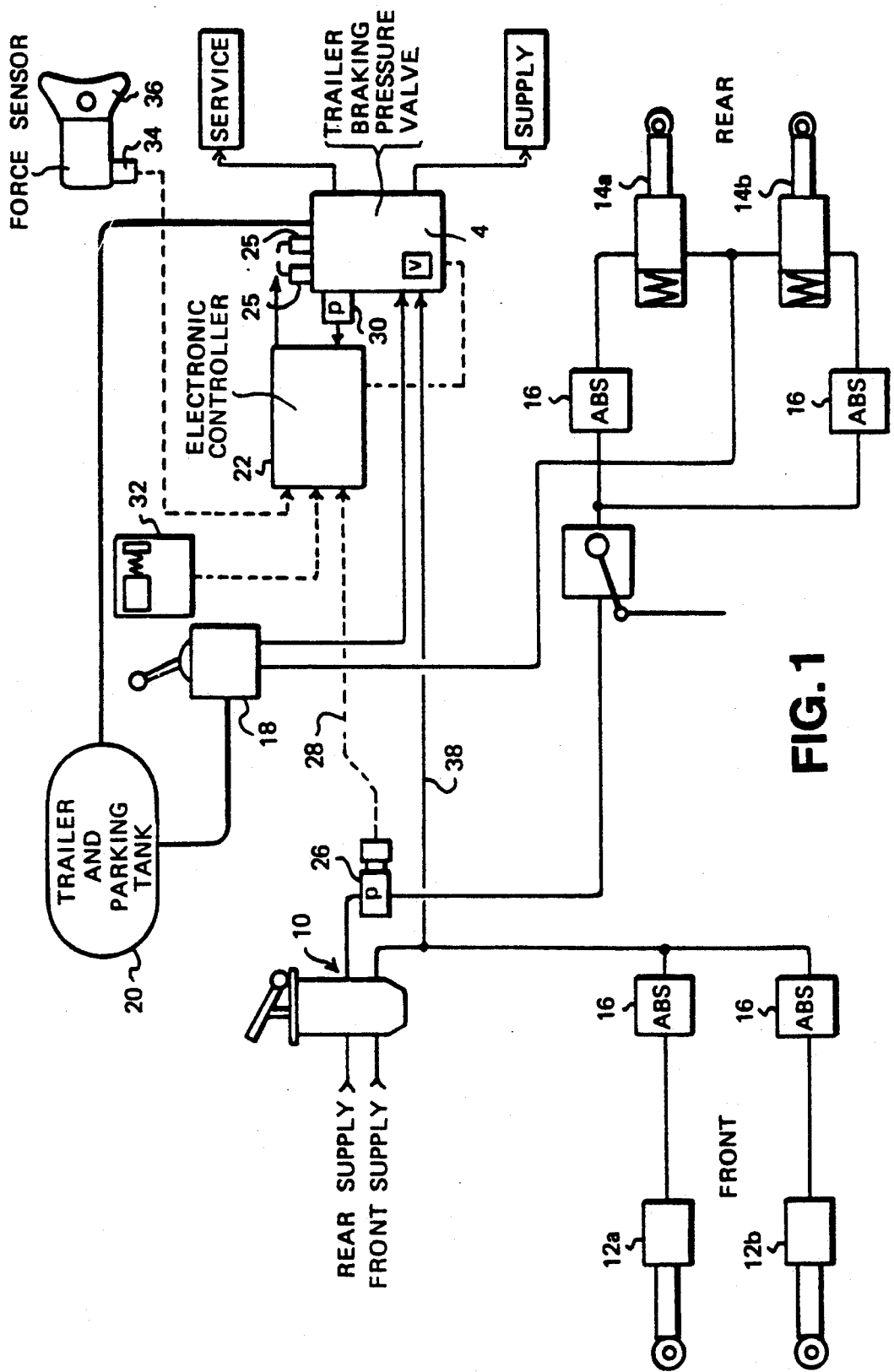
FIG. 1 shows the basic layout of a non-EPB towing vehicle pneumatic braking system to which one embodiment of control apparatus in accordance with the present invention has been applied.

Referring first to FIG. 1, the basic non-EPB braking system of the towing vehicle is shown. This includes a brake pedal transducer 10 which is connected to front and rear pneumatic supplies and which generates pneumatic signals to FRONT and REAR brake actuators 12a, 12b and 14a, 14b, respectively, via ABS (anti-lock) controllers 16. A park valve 18 is energised from a trailer and parking tank 20. For enabling operation in accordance with the present invention, the illustrated embodiment is fitted with an electronic controller 22 and an electrically controlled trailer braking pressure valve 24 for supplying braking pressure signals to a conventional draw-bar trailer. The trailer braking pressure valve 24 generates the trailer braking pressure signal in response to an electrical input produced by a pressure sensor 26 which is installed in one circuit (in this case the rear circuit) of the brake foot valve 10 and receives a pressure each time there is a braking demand by the driver. The electronic controller 22 receives this signal via a line 28 and energises a change-over valve V within the trailer brake valve 24 to remove the pneumatic back up (which is provided by the other one of the pneumatic brake circuits) and to connect the control chamber of the valve 24 to two high speed solenoid valves 25 which set the control chamber pressure in a closed loop system formed by the electronic controller 22 and a feedback pressure sensor 30 which is connected into the aforementioned control chamber.

The controller 22 also receives signals from a towing vehicle-mounted longitudinal decelerometer 32 and from a force sensor 34 which is located in the trailer coupling 36 for the purpose of measuring longitudinal compressive or tensile forces at the trailer coupling.

Thus, driver's braking demand at the transducer 10 is converted into an electrical signal by the pressure sensor 26 and is used by the trailer braking pressure valve 24, after suitable modification as described hereinafter, to generate an appropriate pneumatic braking signal to suit any standard trailer via the normal linking pipes or suzies.

It is an important feature of the present system that it should be capable of adapting the pressure signal from the sensor 26 at very low braking levels to suit the cut-in threshold characteristics of the trailer brakes i.e. the point at which the trailer brakes are applied relative to the point at which the towing vehicle brakes are applied, and, secondly, that it should be capable of adapting the pressure signal from the sensor 26 to match the characteristics of the towing vehicle brakes by sensing the trailer thrust loads at these very low braking levels and, by adjusting the coupling head pressures, thereby improve the compatibility between the towing vehicle and various trailers to which it becomes linked in the course of normal road operations.

To achieve this low level adjustment, which is important in achieving comparable wear of friction linings on both towing vehicle and trailer, the control system measures and allows for the "natural" retardation which mainly affects the towing vehicle, such as rolling and wind resistance and engine braking, which can be quite significant, particularly where exhaust brakes or the like are employed.

For this latter purpose, the present system makes an assessment of the base thrust figure between the vehicles, which is being monitored continuously but is arranged to be sampled (after filtering) just at the point where the main towing vehicle brakes are first applied. Because of the filter delay parameters, this sample represents trailer thrust being felt just before the braking demand commenced. This sampled value is processed and stored as a reference, which is used as the target thrust throughout the stop, either in a direct form or as further processed throughout the stop, in order to make allowances for the general fall in "natural" retardation of the towing vehicle as the speed reduces. Comparing measured thrust or tension averages with this processed base thrust figure generates a thrust error which is used as the input to the adaptive correction systems. This accumulates error signals over several stops and gradually changes the trailer braking pressure cut-in step, i.e. the point at which the trailer brakes are applied, in order to reduce this thrust error to zero, at low braking demands.

The control system also regulates trailer braking pressures at higher braking demands by using additional adjustable adaptive parameters which control the relationships between driver brake demand pressure and trailer coupling head pressure at increasing brake demands and the particular one at these parameters which is used on any given stop is selected by either demand level or, preferably, the achieved vehicle deceleration. Thrust error signals are used to form and adjust, over a number of stops, these adaptive parameters as part of the learning process by which the condition of trailer braking is assessed in relation to the towing vehicle braking capability. An important advantage of this system, which functions on accumulated error signals, is that each stop can be assessed with regard to a number of features as to its suitablilty to generate a new contribution to the appropriate adaptive parameter. Typical of such qualifying features are brake demand, speed at the start of the stop, and duration of the stop. Any stop which is rejected as being unsuitable to qualify for use in making a contribution to the accumulated error, receives the previously accumulated correction but simply does not contribute towards the correction of subsequent stops.

The present system assesses and adapts to the comparative performance between towing vehicle and trailer braking levels so that a towing vehicle with poor brakes causes the trailer braking signal to be reduced in order that compatibility is maintained. Thus, in an emergency stop, there may be some trailer braking capability which is not being brought into play. The system therefore has a moderately high demand threshold above which any adaptive signal which causes coupling head pressure reduction is gradually over-ridden as demand rises to restore full trailer braking for such emergency applications.

As explained briefly hereinbefore, FIG. 1 shows the present control system incorporated into a conventional towing vehicle brake installation in place of the normal trailer brake relay valve and incorporating feedback from coupling thrust and vehicle deceleration via the sensors 34,32, respectively. The demand input is obtained from the rear axle braking circuit via the pressure sensor 26 at the foot valve output and the pneumatic back-up feed is provided from the front circuit via a line 38 and feeds the trailer brake valve 24 via the change-over valve v which is energised each time the pressure sensor 26 signals any rear circuit demand. Under normal operation, the fast solenoid valves 25 control braking pressure in the trailer valve 24 and the pressure sensor 30 feeds back the achieved control chamber pressure to the control unit 22 for electronic control purposes.

An inverse air feed is provided from the parking-/secondary hand valve 18 which is inverted in the trailer valve 24 to generate an override trailer service brake signal, as for conventional vehicles.

Figure 2:
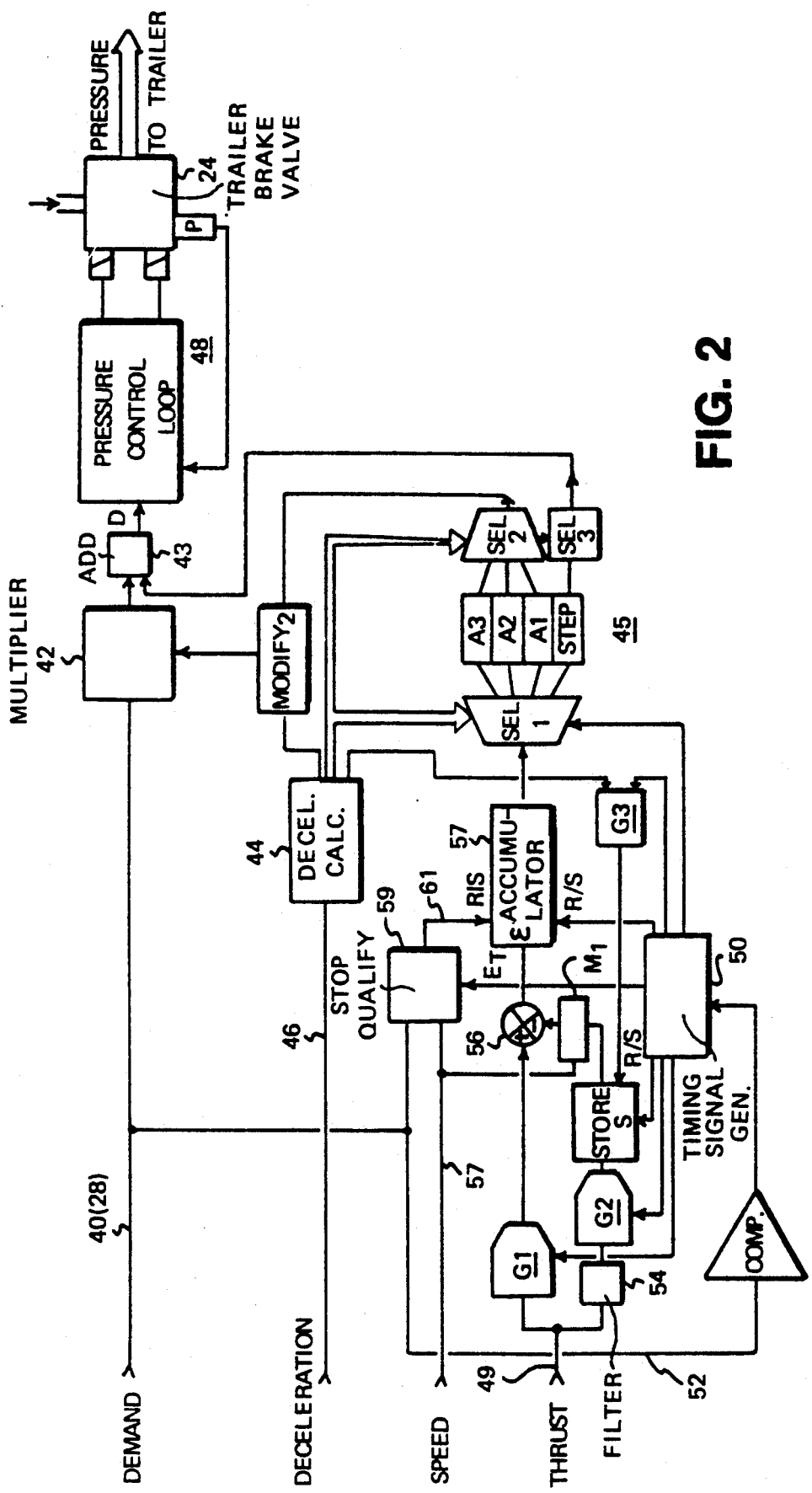
FIG. 2 is a block diagram illustrating one embodiment of an electronic controller forming part of a control apparatus in accordance with the present invention.

Referring now to FIG. 2, there is shown an outline schematic of the controller 22 which takes in the braking demand signal from the sensor 26 on the line 40, multiplies this in a multiplier 42 by an appropriate adaptive variable A1, A2, A3 taken from an adaptive table 45 and selected depending on vehicle deceleration, and adds at an adder 43 a further adaptive variable from the adaptive table 45 in the form of a pressure threshold step. Deceleration is calculated at 44 from the signal from the deceleration sensing means 32 entered via a line 46. The result forms an input demand D to a brake pressure control loop 48 of the known type described in our earlier European Patent No. 0386954, to which reference is hereby directed for further details. The vehicle deceleration is sensed in the controller to produce deceleration band control signals which select, via gate selection elements $SEL_1$, $SEL_2$ and $SEL_3$, the adaptive data (STEP, A1, A2, A3 etc.) in the adaptive table 45 which has been preselected to correspond to that deceleration level band, for use in forming the pressure demand D and to be updated at the end of the stop with any new adaptive correction developed during the stop.

The trailer coupling thrust signal from the sensor 34 enters on a line 49 and is connected to two gates G1, G2 which are opened by pulses from a timing signal generator 50 which is started by rising brake demand pressure, sensed via a line 52 coupled to line 40, each time the brakes are applied. Gate G2 is opened immediately at the commencement of braking to allow a pre-braking, averaged thrust measurement, filtered in a filter 54 to be stored in a store S as the background or "natural" retardation thrust for use in the course of the stop. Gate $G_1$ is opened after a preset time period ($t_1$) which allows for completion of the brakes-on disturbance transient, before the thrust error $E_T$ starts to be accumulated, in an accumulator 57, for a predetermined section of the ensuing stop. The latter error $E_T$ is formed by subtracting in a subtractor element 56 either the whole of the stored background thrust or, alternatively, a speed related version of this, from the thrust measurements which continue to be made during the selected part of the remainder of the stop. Where a speed related proportion of the stored background thrust is used, this is achieved in a function generator $M_1$ coupled to a vehicle speed sensor signal entering on a line 57, which is arranged to cause the output component to fall as the vehicle speed reduces during braking.

At very low braking demands, the selected adaptive variable taken from the adaptive table 45 is arranged to be the pressure threshold step (STEP), the multiplier 42 input being set to unity or a preset scaling factor as to form the trailer braking pressure from scaled demand plus the adaptive pressure threshold step (STEP), which may of course be positive or negative.

Gate $G_3$ provides an option whereby, at higher braking demands being detected by the deceleration sensing unit 44, a reset pulse r is passed from the timing generator 50 via $G_3$ to set to zero the background thrust store S so that thrust measurements are made an subsequently used directly instead of having any reference thrusts subtracted. The adaptive system is thereby adjusted to automatically generate slightly more trailer braking at high braking demands and reduce coupling thrusts to zero for these heavy braking stops where stability is important.

In the event of large thrust loads (tension or compression) being detected, for example possibly following a new trailer with only partially effective brakes being coupled and where the adaptive variables have been reset at the change-over, the mode is changed to allow the error $E_T$ being accumulated to adjust the adaptive variable during the course of a stop as an emergency action in order to reduce the thrust levels to lie below a preset threshold, related to demand, which creates safe operating conditions. Subsequent completion of the adaptive process takes place on a step-by-step basis with consequently, a more gradual rate of adjustment once operational safety has been achieved.

Figure 3:
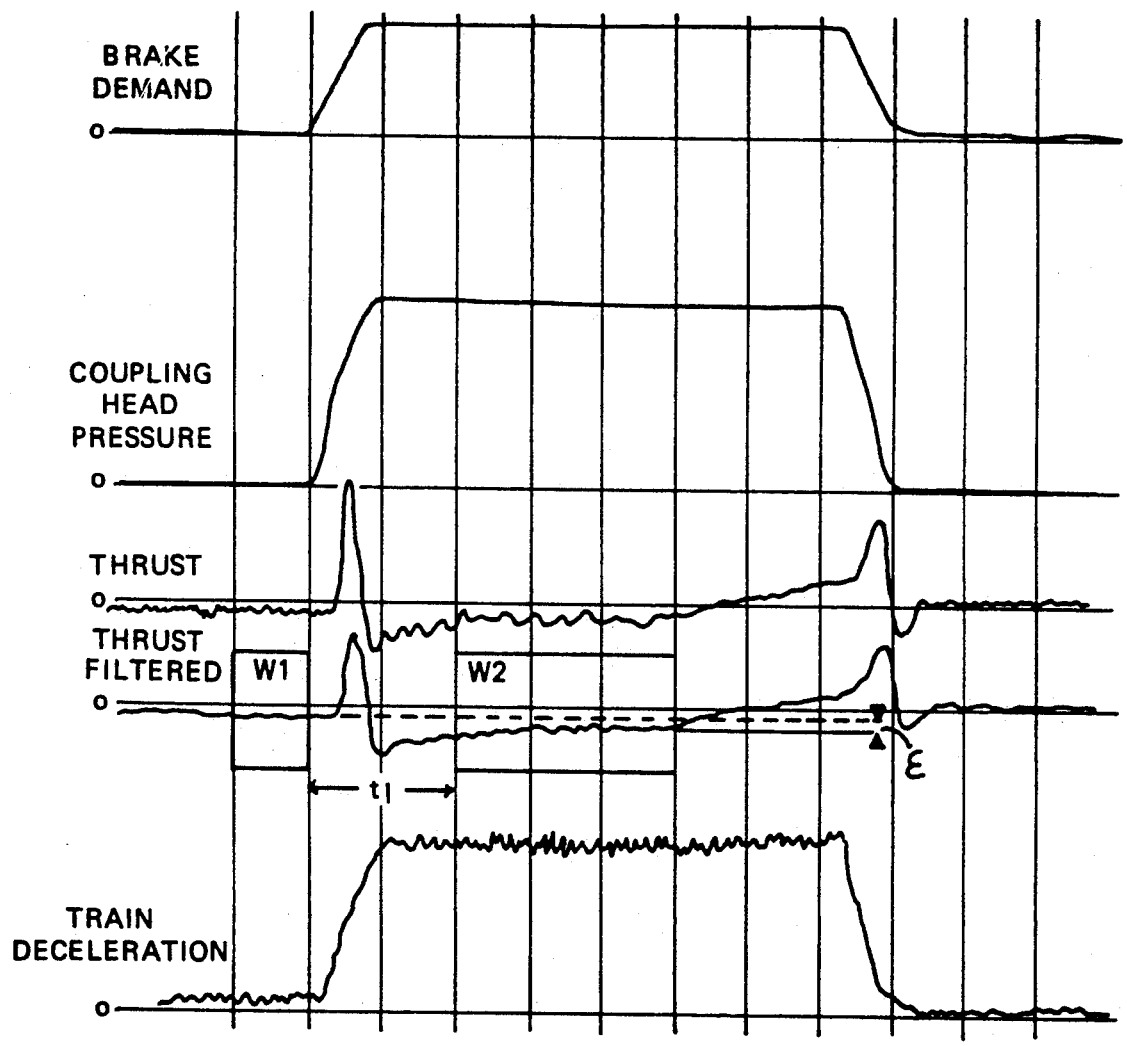
FIG. 3 shows a series of operational traces which illustrate the operation of a braking system fitted with the present apparatus.

Operation of the system of FIGS. 1 and 2 is illustrated in the traces of FIG. 3 where, as soon as braking demand is sensed at the sensor 26, the output of the thrust filter 54 is stored for use as a reference background during the remainder of the stop. This is shown in FIG. 3 as being effectively a filtered thrust sample taken at a window $W_1$ just before the initiation of braking, because filtered data is unavoidably historical. As braking is applied on the towing vehicle and trailer, there is inevitably a high chance of unequal braking build up which results in a thrust transient, so for a preset period identified as $t_1$ in FIG. 3, the thrust measurements are cancelled. Subsequently, a second sample window $W_2$ is opened during which actual thrust measurements are processed, accumulated and averaged. The accumulated and averaged values are the levels over and above the $W_1$ sample which was stored as the reference thrust. A preset proportion of the final average error resulting at the end of the stop is used to modify in a corrective direction that one of the adaptive variables (STEP, A1, A2, A3 etc.) which corresponds to the detected prevailing deceleration band. For very short stops or those subject to considerable change in braking demand, the stop qualifying subsystem 59 decides to exclude that stop from the adaptive process by resetting the accumulated data via a line 61, and inhibiting any transfer to modify any adaptive variable.

For high braking demands where it is important to make full emergency braking available on both the towing and trailer vehicles, the adaptive system, which may be reducing trailer braking to achieve compatibility will be progressively overridden. Above a preset high demand, any adaptive braking cutback is reduced by an amount depending on deceleration demand sensed in a second function generator $M_2$ in FIG. 2 so that at maximum braking demand on the towing vehicle, maximum coupling head pressure is generated within the trailer valve control loop. This is shown in FIG. 4, where the nominal trailer which has braking and is entirely balanced with the towing vehicle generates pressure as in line A without requiring any adaptive change from the nominal start point. Line B represents a trailer with poor braking which would be adapted up and reaches maximum pressure before the towing vehicle demand does so. Line C is for a trailer with very good brakes or being towed by a truck with poor brakes where the trailer is being adapted down for compatibility and above 6 bar demand gradually loses the cut back and achieves a nominal position at full pressure, shown in FIG. 4 as being 8 bar—but this could alternatively be organised to occur at lower pressure.

Reference is now made to FIG. 5 which illustrates diagrammatically a number of possible actions which the system might make in response to various different levels of braking/deceleration.

1. Qualifying Stop at Low Braking Demand/Deceleration

When the brakes are first applied at point (a), the decel sense 44 passes on the detected deceleration level to both the input selector $SEL_1$ and the output selectors $SEL_2$ and $SEL_3$ of the adaptive table 45. These selectors move their respective pointers to the appropriate addresses in the look up table, the particular address selected being determined by the magnitude of the deceleration—the higher the deceleration then the higher up in the table will be the address selected. As this stop is a low level stop, the pointer select the STEP variable location in the table 45. Immediately the brakes are applied, the lower of the two output selectors in FIG. 2, $SEL_3$, passes on a pressure step to the adder 43. Since the upper selector $SEL_2$ is not in operation, no adaptive variable from A1, A2 or A3 is sent to the multiplier 42. The step addition is representative of the pressure required to bring the trailer brakes into engagement without applying any substantial braking force. If at the end of the assessment period, represented by the termination of window $W_2$ in FIG. 3, a thrust error has been accumulated then this error is passed on to the respective address in the look up table to modify the adaptive variable stored there, for use on the next stop. The transfer of this error value can be effected by the issuance of a signal from the timing generator 50 at the end of the period $W_2$. Thus, in the case of a qualifying stop at low braking demand/deceleration, the demand D being fed to the pressure control loop 48 in FIG. 2 is made up of the drivers demand input on line 40 multiplied by a unity factor in multiplier 42 and added to the STEP value in adder 43.

2. Qualifying Stop at Medium Duty Demand or Deceleration

When the brakes are applied on the towing vehicle, the decel sense 44 passes on the deceleration level to the selector $SEL_1$ and output selectors $SEL_2$, $SEL_3$ as in the case of the low level stop. This time, however, the selectors point to a higher address which has the immediate effect of feeding both the STEP variable to the adder 43, as well as a second, deceleration-dependent adaptive variable, perhaps A1, into the multiplier 42. Since the second adaptive variable acts to ratio the driver's demand input via the multiplier 42, then the input to the pressure control loop 48 is made up in this case of the driver's demand on line 40 multiplied by the adaptive variable A1, added to the adapted STEP value in 43.

3. Qualifying Stop at High Duty Demand or Deceleration

At a higher duty stop, the decel sense 44 passes on the deceleration level to the selectors $SEL_1$, $SEL_2$ and $SEL_3$ which select a still higher address in the look up table, perhaps A3. Additionally, the high deceleration level is detected by the modifier M2. In this case, therefore, the input pressure to the pressure control loop 48 is made up of the driver's demand on line 40 multiplied by the adaptive variable A3, which has itself been modified by the modifier M2 to reduce any adaptive braking cut-back by an amount proportional to the sensed deceleration, and this is added to the adapted STEP value in 43.

Referring now to FIG. 5, there is shown very diagrammatically the output of the two adaptive variables combined. At point (a), where braking is commenced, a step input (STEP) is added to all trailer braking input. This step input is adapted (as indicated diagrammatically by arrow c) over a number of qualifying stops to provide a pressure equating to the trailer brake hysteresis and is therefore adapted to take account of any change in trailer base characteristics. From the step input, the three adaptive variables A1, A2, A3 are shown as slopes since they are used to adjust driver's demand input via a multiplier (42) and therefore can be illustrated as ratios. Each adaptive variable A1, A2, A3 can itself be modified over a number of qualifying steps as indicated diagrammatically by the arrows d, e and f. The upper adaptive variable A3 is further modified by the modifier M2 but the effect of this is not shown in FIG. 5.

Thus, the illustrated embodiment has two adaptive variables, STEP and any one of A1, A2 and A3. One of these variables is corrected at the update point (end of window W2) on every qualifying stop the particular variable which is updated on any particular qualifying stop being selected by the selectors S1, S2, S3 in dependence upon deceleration level. The first adaptive variable, STEP, represents a pressure step which equates to the pressure threshold at which the trailer brakes begin to commence braking action, i.e. STEP (pressure)=- pressure required to overcome trailer brake hysteresis. Thus, when the brakes are applied on the towing vehicle, the trailer sees a STEP input, such that the towing vehicle and trailer brakes commence actual braking at substantially the same time.

I claim:

1. A braking control system in a towing vehicle for providing controlled braking pressures to a trailer vehicle when coupled to the towing vehicle, the system comprising:
    (a) trailer coupling means on the towing vehicle for connecting the towing vehicle to a trailer vehicle;
    (b) force sensing means at said trailer coupling means for detecting longitudinal thrust forces acting on the trailer coupling means between the towing vehicle and a trailer vehicle, when coupled thereto;
    (c) means for generating a service braking pressure signal on the towing vehicle for supply to the trailer vehicle;
    (d) means for establishing a braking pressure signal representative of a driver's input demand;
    (e) means for regulating said service braking pressure signal in response to driver's demand pressure and measured valued of longitudinal force exerted on said coupling means just before and during braking;
    (f) means for developing at least two adaptive variables in the control system on the towing vehicle for use in regulating said trailer service braking pressure signal derived from said driver's demand signal;
    (g) means for establishing whether a current stop constitutes a qualifying stop of a vehicle/trailer combination, meeting prescribed operating characteristics;
    (h) means for choosing one of said at least two adaptive variables to be corrected at that stop;
    (i) means for establishing average error signals in thrust forces applied by a trailer to the towing vehicle compared to a reference thrust level; and
    (j) means for correcting the chosen adaptive variable at the end of that stop using said average trailer thrust force error signals, for use in regulating said trailer service braking pressure signal on subsequent stops.

2. A trailer braking control system according to claim 1, wherein one of said at least two adaptive variables comprises a threshold pressure step and including means, when said threshold pressure step is selected as said one of said at least two adaptive variables during a particular qualifying stop, for adjusting said threshold pressure step using said thrust error signals at the end of that stop, such that braking is commenced on said trailer vehicle at the same point of input demand that braking becomes effective on said towing vehicle.

3. A trailer braking control system according to claim 2, including means, when said threshold pressure step is selected as the chosen adaptive variable, for adding said threshold pressure step in an adder to said signal corresponding to said driver's demand pressure to establish an input demand pressure to a pressure control loop.

4. A trailer braking control system according to claim 3, including means, when another one of said at least two adaptive variables is selected as the chosen adaptive variable, for using said other one of said at least two adaptive variables to multiply, by a corresponding factor in a multiplier said driver's demand pressure to establish, with any signal added at said adder, the input demand pressure to said pressure control loop.

5. A trailer braking control system according to claim 4, including means for accepting a "natural" retardation—induced thrust of a trailer vehicle on the towing vehicle just before braking commences, means for storing the latter trailer vehicle thrust for use as said reference thrust, in either one of a fully and a reducing percentage, as towing vehicle speed falls, when forming thrust error signals for correcting a selected one of said at least two adaptive variables at the end of a particular qualifying stop.

6. A trailer braking control system according to claim 5 including means for forming, at high braking demands, said thrust error signals from direct trailer thrust measurements, without making use of said stored "natural" retardation thrust.

7. A trailer braking control system according to claim 4, including means for assessing average thrust exerted by said trailer vehicle on said towing vehicle only during a predetermined assessment period of a stop, such period commencing after a preset inhibit duration, wherein said inhibit duration starts at the commencement of braking.

8. A trailer braking control system according to claim 7, including means for varying said assessment period in dependence upon towing vehicle speed at the commencement of a stop, but always after said preset inhibit period.

9. A trailer braking control system according to claim 4, including means for progressively reducing, at very high braking demands above a preset threshold, any adaptive reduction in braking developed by the control system as demand exceeds the latter threshold so that, at full braking demand, full braking is signalled at said trailer vehicle.

10. A trailer braking control system according to claim 4, including means for commencing, in the event of very high trailer thrust error signals being detected, an adaptive process in the course of a stop in order to reduce said error to a minimum threshold greater than zero, from which said error is further normally adaptively corrected on a stop-by-stop basis.

11. A trailer braking control system according to claim 4, wherein a "qualifying" stop is one which falls within predetermined limits selected from braking demand, vehicle speed at a start of a stop and duration of said stop.

12. A trailer braking control system according to claim 4, in which that one of said at least two adaptive variables which is selected for correction at the end of a given stop, is chosen on the basis of at least one of detected vehicle deceleration level and detected braking demand at a predetermined point in that stop.

* * * * *